United States Patent [19]

Shawhan

[11] 3,766,658
[45] Oct. 23, 1973

[54] ELEVATION ANGLE INDICATOR
[75] Inventor: Elbert N. Shawhan, West Chester, Pa.
[73] Assignee: Sun Oil Company of Pennsylvania, Philadelphia, Pa.
[22] Filed: June 4, 1971
[21] Appl. No.: 149,896

[52] U.S. Cl. .................. 33/366, 33/379, 313/662
[51] Int. Cl. ......................... G01c 9/06, G01c 9/26
[58] Field of Search ..................... 33/283, 366, 369, 33/377, 378, 379, 380, 384, 312

[56] References Cited
UNITED STATES PATENTS
| 609,231 | 8/1898 | Hicks et al. | 33/366 |
| 2,592,941 | 4/1952 | Moore | 33/366 |
| 2,936,411 | 5/1960 | Doty | 33/366 |
| 3,673,696 | 7/1972 | Wasson | 33/379 |

Primary Examiner—Robert B. Hull
Assistant Examiner—Richard R. Stearns
Attorney—George L. Church, Donald R. Johnson, Wilmer E. McCorquodale and Frank A. Rechif

[57] ABSTRACT

A body of liquid contained in a ring-shaped piece of tubing serves as a liquid pendulum. Changes in the elevation angle of the support on which the tubing is mounted cause the tubing to rotate relative to the liquid; this relative rotation is sensed by means of a pair of capacitor electrodes coupled to the liquid, variations in capacitance causing energization of a driving motor in a direction to rotate the tubing back to a null position. The amount of rotation of the support, and hence the elevation angle, is indicated on a digital voltmeter supplied from a potentiometer mechanically coupled to the shaft which rotates the tubing.

3 Claims, 3 Drawing Figures

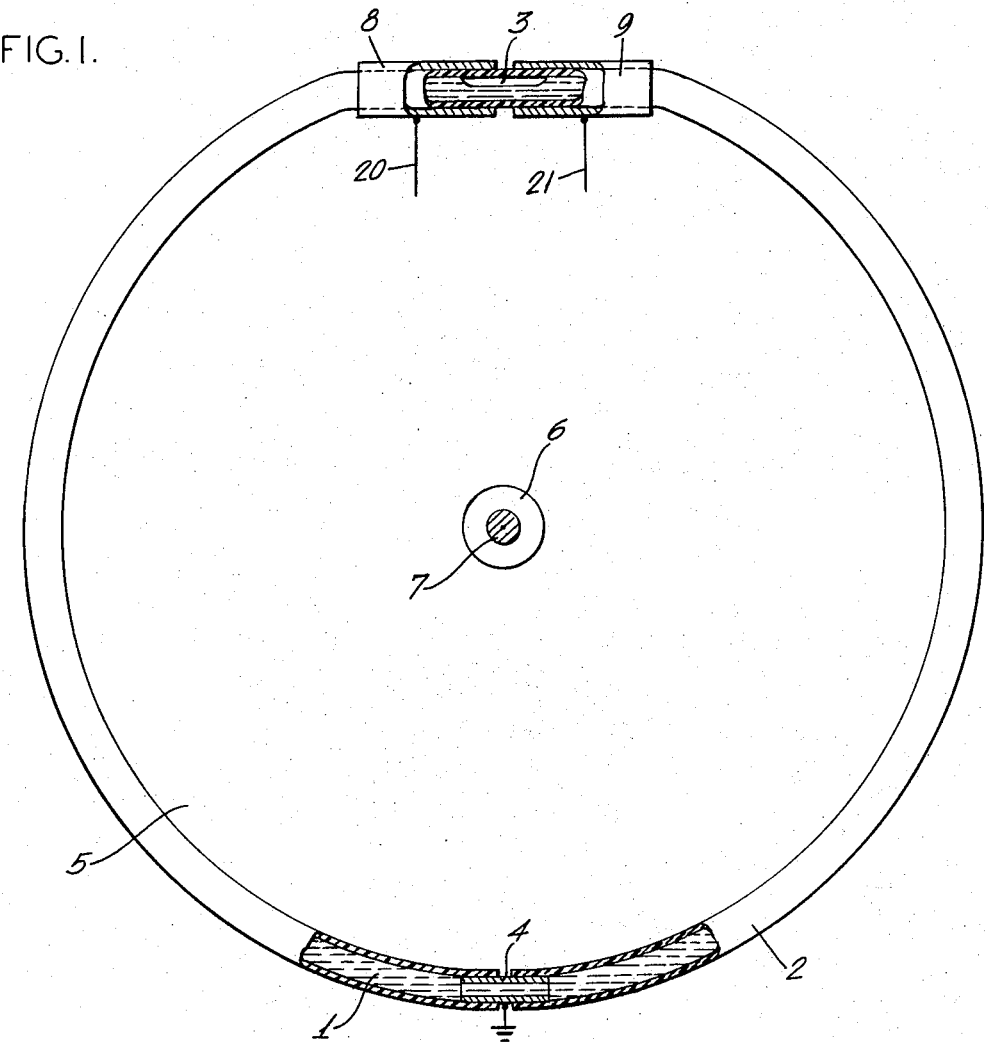
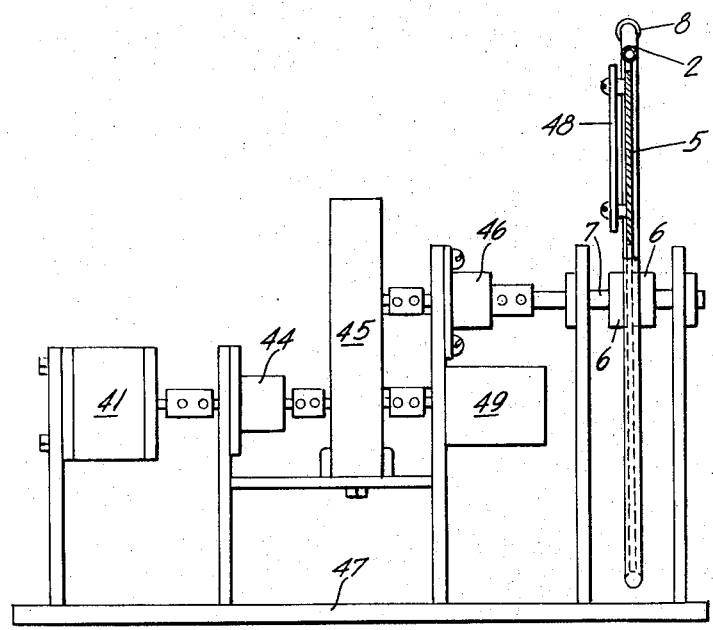

ELEVATION ANGLE INDICATOR

This invention relates to an elevation angle indicator, and more particularly to a measuring and indicating system useful on a mobile instrumentality for indicating the elevation angle (angle of inclination with respect to the horizontal) of a portion thereof.

This invention is not limited to use with any particular mobile instrumentality, and may be used with various instrumentalities. However, by way of example, a typical application or use for the indicator of this invention will now be described.

For the surface mining of tar sands (from which crude petroleum may be extracted), an instrumentality known as a bucketwheel excavator (BWE) is used. The BWE is a large and ponderous machine which is capable of moving over the ground on crawler-type treads, the machine having a boom (movable in a vertical plane so as to vary its inclination with respect to the horizontal) at the end of which is mounted an array of rotating bucketwheels which do the actual mining of the tar sands.

The BWE cannot crawl up a grade steeper than approximately 6°; hence, a constant monitoring of the elevation angle of the crawlers is essential (to make sure that this angle does not exceed the maximum previously mentioned).

Also, for efficient mining of the tar sands (to prevent the bucketwheels from digging into deposits of hard rock below the sands, which would adversely affect the bucketwheel teeth), a constant monitoring of the elevation angle of the bucketwheel boom is also required.

Elevation angle indicators, capable of being used on mobile instrumentalities, have been developed previously, but each of these prior systems ordinarily utilizes a pendulum of classical type suspended from a support; such systems require rather sophisticated arrangements for counteracting or nullifying the effect on the pendulum of linear accelerations, shock, or vibrations transmitted through the support.

An object of this invention is to provide a novel elevation angle measuring and indicating system, with remote readout or indication of the elevation angle.

Another object is to provide a level sensing element, adapted to be mounted on a mobile instrumentality, which is not affected by linear accelerations, shock, or vibrations transmitted through its support.

A further object is to provide novel circuitry for measuring the difference in capacitance between two capacitors and for converting this difference to a phase-variable control voltage for a motor.

A detailed description of the invention follows, taken in conjunction with the accompanying drawings, wherein:

FIG. 1 is a front elevation or face view of a level sensing element utilized in the present invention;

FIG. 3 is a side elevation illustrating the mechanical arrangement.

Figure 2:
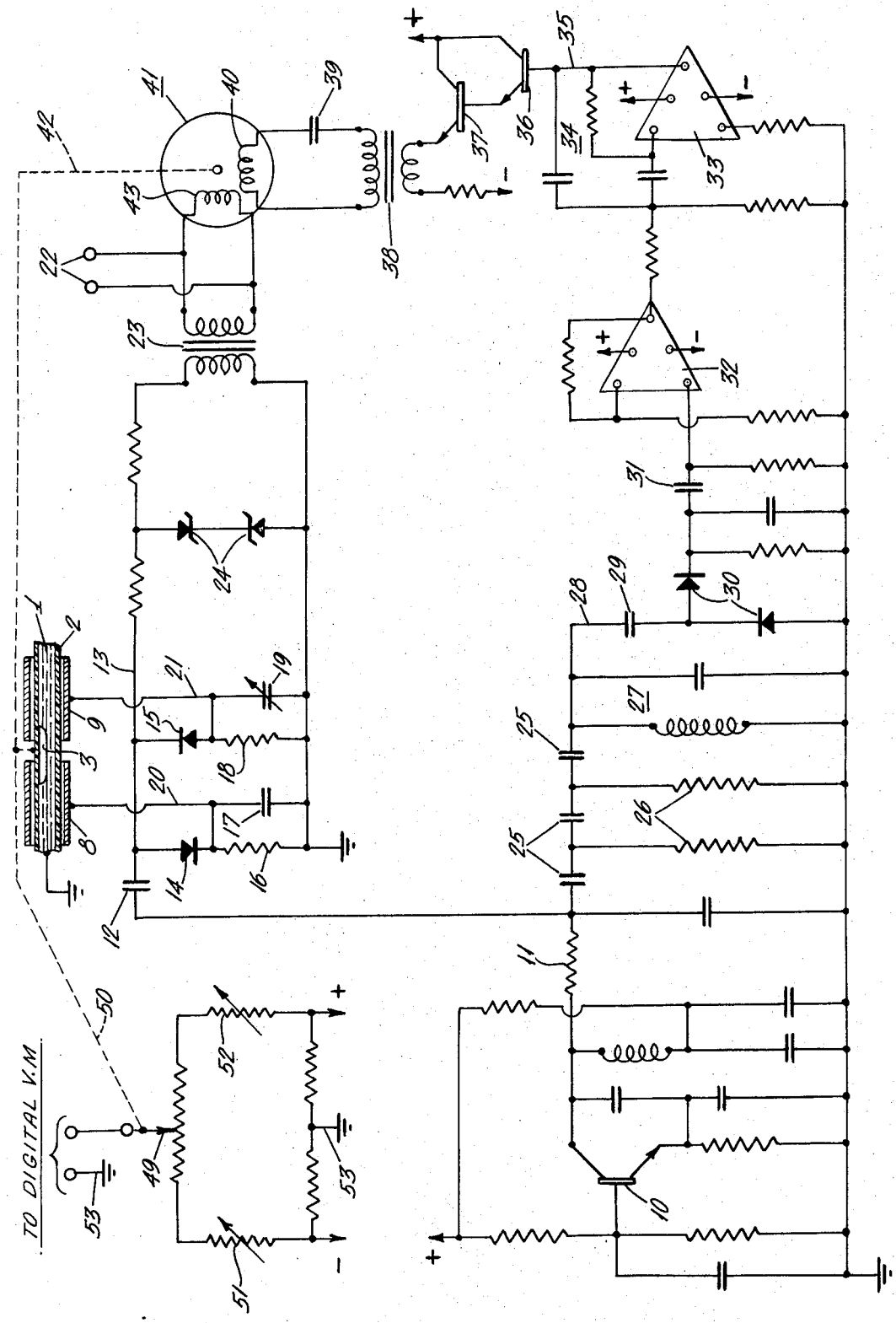
FIG. 2 is a schematic of the electrical circuitry utilized in the invention.

Referring first to FIG. 1, the level sensing element or level sensor utilized in this invention is based upon a liquid pendulum. The liquid pendulum has the form of a ring-shaped body of liquid 1, contained in a length of tubing 2 formed into a circle as illustrated. The tubing 2 is made from an appropriate material having dielectric or insulating properties, a particularly suitable material being the polytetrafluoroethylene synthetic resin known as Teflon. The tubing ring 2 may have a diameter of 12 inches, by way of example, and may be formed from ½ inch I.D. tubing.

The tubing is entirely filled with the liquid 1, except for a small bubble 3 of air. The bubble 3 may have a nominal length of 0.5 inch, its size, of course, varying with the temperature of the liquid; however, its size is not significant, as will later become apparent. The liquid 1 may be ethanol, with sufficient potassium iodide or lithium iodide dissolved therein to make it electrically conductive. The fitting for filling the tubing 2 with liquid is not fully illustrated in FIG. 1, but may comprise a tee fitting 4 a portion of which is shown. The two ends of the piece of tubing 2 may be sealed respectively over the two aligned arms of the fitting 4, the straight portion of the fitting 4 then forming a metallic sleeve which is inside the tubing 2 and thus is in direct electrical contact with the liquid 1. In the normal position of the tubing 2, which is illustrated in FIG. 1, the fitting 4 is located at the lowest point of the circle or ring. The fitting 4 is connected to a ground or reference potential point in the electrical circuit, as indicated in FIG. 1.

The ring of tubing 2 is mechanically secured (as by suitable clips, for example, not shown) to the periphery of a disc 5 formed from an electrical insulating material, such as a suitable phenolic resin. Disc 5 is rotatably mounted with respect to a fixed support, as will be described later in connection with FIG. 3, the rotation being in a vertical plane, about a horizontal axis which passes through the center of the disc; a mounting flange for this is denoted by numeral 6 and the shaft which is driven to cause the rotation is denoted by numeral 7.

The circle of liquid 1 is supported (by shaft or axle 7) at its center of gravity. The weight of the fitting 4 (which is secured to the tubing 2, and rotates with it) is partially counterbalanced by a weight (not shown) above the disc axle 7 so the center of gravity is kept very near the center of shaft 7. Gravitational effects force the bubble 3 to the highest point of the body of liquid 1.

Since the ring of liquid 1 is supported at its center of gravity, shock, vibration, and linear accelerations, transmitted through the support have no effect on the position of bubble 3. To state this another way, by utilizing a complete ring of liquid (rather than a linear body of liquid, such as in an ordinary carpenter's level, for example), acceleration forces applied to the two sides of the ring are balanced out at the central support.

However, changes in the angle of tilt of the support (and hence of the disc 5) cause the tubing 2 to rotate relative to the liquid 1. Since there is little drag between the liquid and the Teflon tubing (the lubricity characteristics of Teflon being well known) at rates of tilt possible with the BWE, no motion of the bubble 3 can be detected, which is to say that the bubble remains essentially fixed in space, while the tubing rotates relative thereto upon a change in the angle of tilt of the support (that is, upon a change in the elevation angle of the support).

The position of the bubble 3 (relative to tubing 2) is sensed by means of two capacitors, now to be described. A pair of metallic sleeves 8 and 9 (made of aluminum for example) closely surround the tubing ring 2 at the top thereof so as to rotate therewith, these sleeves being for example 2 inches long and spaced 0.1 inch apart. One capacitor is formed by the conducting liquid 1 as one plate (connected to ground by means of sleeve 4), sleeve 8 as the other plate, and the Teflon wall of the containing tube 2 as the dielectric; the other capacitor is formed by the conducting liquid 1 as one plate, sleeve 9 as the other plate, and the Teflon wall of tube 2 as the dielectric. The capacitances of these two capacitors are equal when the bubble 3 is centered between the plates 8 and 9, that is, when the center of the bubble is located exactly halfway between the plates 8 and 9. The capacitances are unequal when the bubble 3 is not centered between the plates 8 and 9, and the displacement of the bubble is indicated by the difference in capacitance of the two capacitors. When the bubble is displaced from the center in one direction, the capacitance of one capacitor is increased and that of the other is decreased; when the bubble is displaced from the center in the opposite direction, the capacitance of said one capacitor is decreased and that of said other capacitor is increased. Since only the position of the center of the bubble is significant, the actual size of the bubble is unimportant.

The circuit of FIG. 2 measures the difference in capacitance between the two capacitors described. A transistor 10, connected in a more or less conventional circuit to operate as a high frequency oscillator (on the order of 300 kHz, for example), supplies high frequency current through a dropping resistor 11 and a coupling capacitor 12 to a lead 13, between which lead and ground are coupled two oppositely arranged switching diodes 14 and 15. Diode 14 is connected in series with the parallel combination of a resistor 16 and a fixed capacitor 17, between lead 13 and ground, while diode 15 is connected in series with the parallel combination of a resistor 18 and a trimming capacitor 19, between lead 13 and ground. From the common junction of elements 14, 16 and 17 a lead 20 (see also FIG. 1) is connected to sleeve or capacitor plate 8, while from the common junction of elements 15, 18 and 19 a lead 21 is connected to sleeve or capacitor plate 9.

A voltage of power line frequency (60 Hz), obtained from a pair of terminals 22 through a transformer 23, is clipped by means of a pair of Zener diodes 24 connected back-to-back essentially between lead 13 and ground, and fed as essentially a square wave switching voltage (of 60 Hz) to the switching diodes 14 and 15. During one half-cycle of the switching voltage, diode 14 conducts, and during the other half-cycle, diode 15 conducts. When diode 14 is conductive, the high frequency current supplied by oscillator 10 is fed to the capacitor including plate 8; when diode 15 is conductive, the high frequency current is fed to the capacitor including plate 9. Thus, high frequency current is connected to each capacitor in turn at the 60 Hz rate.

The high frequency voltage across each capacitor is inversely proportional to its capacitance. The high frequency voltages across the capacitors are fed through an RC high pass filter comprising series capacitors 25 and shunt resistors 26 to parallel LC circuit 27 tuned to the oscillator frequency, and having a low impedance at 60 Hz. Circuit 27 eliminates the 60 Hz switching voltage, leaving at the output side 28 of this circuit the carrier modulated by a 60 Hz square wave. The amplitude of the modulation is a measure of the difference between the capacitances of the two capacitors, and its phase indicates the sense of the difference.

The modulated carrier is fed through a capacitor 29 to a pair of diodes 30 connected as a peak-to-peak rectifier, which acts to recover the modulation envelope; this envelope signal is fed through a d.c. blocking capacitor 31 to the input of an integrated circuit amplifier 32 having a gain of about 100. The amplified 60 Hz envelope is fed through an amplifier 33 connected to serve as an active filter, by appropriate choice of the components in its feedback network 34. The filter network 34 is peaked at 60 Hz, and has a narrow pass band. Consequently, the active filter 33 corrects the waveform so that the residual distortion is limited to substantially only second harmonic. Thus, there appears at the output 35 of this active filter a 60 Hz sine wave output voltage whose amplitude is a measure of the difference between the capacitors 8 and 9; as the bubble 3 moves from one capacitor to the other, the phase of this output voltage reverses. When the bubble is centered between the capacitors, only second harmonic (120 Hz) remains.

The 60 Hz circuit output voltage at 35 is amplified by a pair of transistors 36 and 37 connected as emitter followers, and is then fed through a transformer 38 and a capacitor 39 (which latter shifts its phase 90°) to the control winding 40 of a two-phase servo motor 41 which mechanically drives the disc 5 and tube 2 (as will hereinafter be described in more detail). This mechanical connection is indicated schematically at 42 in FIG. 2.

Line voltage (obtained from terminals 22) is connected to the power winding 43 of motor 41. The 60 Hz circuit output voltage fed to winding 40 of motor 41 cooperates with the 60 Hz line voltage fed to winding 43 of this motor to energize the same, causing it to rotate in one direction or the other, depending on the phase of the circuit output voltage fed to winding 40. That is to say, the direction of rotation of the motor reverses as the phase of the circuit output voltage is reversed. Second harmonic in the control winding 40 has no effect on the motor 41.

Refer now to FIG. 3, which illustrates the mechanical arrangement. The motor 41, operating at about 1800 RPM, provides input through a gear head speed reducer 44 (providing a reduction of 100:1) to a gear box 45 (ratio 1:1) having one input and two outputs. One of the outputs of box 45 rotates shaft 7 (to which disc 5 is fastened, as previously stated) through a gear head 46 which may provide a speed reduction of 60:1, or 300:1. The items 41, 44, 45, 46, and 7 may be supported by a fixed support 47, as illustrated in FIG. 3; the various rotating parts, including shaft 7 and disc 5 (with its tube 2) are mounted for rotation with respect to the support 47.

The motor 41 drives the disc 5 to a null position, that is, one wherein the two capacitances 8 and 9 are equal (at which point the circuit output voltage goes to zero, insofar as 60 Hz voltage is concerned). In other words, the disc 5 carrying the ring of liquid 1 on its circumference is rotated until the bubble 3 is centered between the two capacitors; at this point, the radius midway between the capacitor plates 8 and 9 (and passing through the center of the bubble) is vertical. This null position is maintained (through the servo or follow-up action described) as the support 47 (and hence the disc 5) tilts.

In an actual embodiment of the system which was built and tested, a bubble displacement of 0.01 inch gave a complete phase reversal in the circuit output voltage. This corresponds to an over-all accuracy of well within six minutes of elevation angle.

The circuit components of FIG. 2 preferably are supported on lugs riveted to a board 48 of insulating material which is mounted on the disc 5, as illustrated in FIG. 3. In a BWE, the support 47 could be mounted on the platform which is parallel to the crawler treads, for measuring the angle of tilt (elevation angle) of the crawlers. A duplicate level sensor, utilizing another support similar to 47 with all of the components previously described, could be attached to the bucketwheel boom, for measuring the angle of tilt (elevation angle) of this boom.

The other output of gearbox 45 drives a ten-turn linear potentiometer 49, the mechanical coupling between motor 41 and potentiometer 49 (which coupling includes items 44 and 45 of FIG. 3) being indicated at 50 in FIG. 2. Thus, the rotation of potentiometer 49 follows the angular rotation of disc 5, since both are driven by the same motor 41. A stable voltage (indicated by the plus and minus signs in FIG. 2) is connected across the terminals of potentiometer 49, for example through trimming potentiometers 51 and 52. The midpoint between the positive and negative sides of this stable voltage source is grounded, as indicated at 53. The slider 49 is driven by motor 41 in correspondence with the rotation of disc 5, so that a voltage proportional to the angle of tilt measured by disc 5 is developed by this potentiometer; specifically, the voltage which is connected across the terminals of potentiometer 49 is so chosen that the potential difference between the slider of potentiometer 49 and ground 53 is equal in volts to the disc rotation in degrees. The slider of potentiometer 49 is connected by means of a cable to a digital voltmeter in the BWE operator's cab, which offers a remote readout. The digital voltmeter (not shown) may be a four-digit voltmeter which then reads angles in degrees and tenths of a degree, with the sign of the voltage indicating whether the angle is measured above or below the horizontal. By way of example, the voltmeter for the BWE crawler level might read +6.0° to −6.0°, while the voltmeter for the BWE bucketwheel boom might read +30.0° to −30.0°.

By using a voltmeter with internal contacts, warning lights and an audible alarm could be added to the crawler angle indicator for the BWE.

A commercially-available sine converter module could be easily added between the bucketwheel boom potentiometer and its readout voltmeter. This would permit direct readout of changes in bucketwheel elevation, in feet and decimal parts of a foot.

The invention claimed is:

1. In a level sensor for an elevation angle indicator, a ring-shaped container, a body of electrically conductive liquid completely filling said container except for the space occupied by a gas bubble whose volume is small compared to the total volume of said liquid, means mounting said container on a support whose elevation angle is to be indicated, the mounting means being located substantially at the center of the ring, whereby changes in the elevation angle of said support cause movements of said container relative to said bubble; and means for detecting movements, from a preestablished position, of said bubble with respect to said container, said detecting means including a metallic electrode forming one plate of a capacitor with said liquid providing the other plate thereof.

2. Combination according to claim 1, wherein said detecting means includes a pair of metallic electrodes each forming respectively one plate of a pair of capacitors with said liquid providing the other plates of both capacitors, and wherein said preestablished position is one in which the center of said bubble is located midway between said electrodes.

3. Combination according to claim 1, wherein said container comprises a tube made of dielectric material, said tube providing the dielectric for the capacitor the plates of which comprise said electrode and said liquid.

* * * * *